US 6,551,106 B1

(12) United States Patent
Sherin

(10) Patent No.: US 6,551,106 B1
(45) Date of Patent: Apr. 22, 2003

(54) KIT AND A PROCESS FOR FACILITATING EVALUATION OF COOPERATIVE SKILLS OF INDIVIDUALS IN A GROUP ENVIRONMENT

(76) Inventor: John M. Sherin, 356 Dawson La., Jericho, NY (US) 11753

( * ) Notice: Subject to any disclaimer, the term of this patent is extended or adjusted under 35 U.S.C. 154(b) by 0 days.

(21) Appl. No.: 09/753,933

(22) Filed: Jan. 3, 2001

Related U.S. Application Data

(60) Provisional application No. 60/174,293, filed on Jan. 3, 2000.

(51) Int. Cl.⁷ .............................. G09B 1/36; A63F 9/10
(52) U.S. Cl. ..................... 434/259; 434/236; 434/238; 434/259; 273/153 R; 273/157 R
(58) Field of Search ................................ 434/259, 238, 434/237, 236; 273/157 R, 156, 153 R

(56) References Cited

U.S. PATENT DOCUMENTS

| | | | | |
|---|---|---|---|---|
| 156,212 A | * | 10/1874 | Elderkin | 273/148 R |
| 669,445 A | * | 3/1901 | Morey | 273/156 |
| 2,900,190 A | * | 8/1959 | Pestieau | 273/157 R |
| 3,426,452 A | * | 2/1969 | Kerr | 273/157 R |
| 3,438,141 A | * | 4/1969 | Kirksey | 273/157 R |
| 3,638,949 A | * | 2/1972 | Thompson | 273/157 R |
| 3,759,522 A | * | 9/1973 | Hodan, III | 273/157 R |
| 3,811,203 A | * | 5/1974 | Mayfield | 273/157 R |
| 3,981,505 A | * | 9/1976 | Odier | 273/157 R |
| 4,440,394 A | * | 4/1984 | Hicks et al. | 273/157 R |
| 5,123,846 A | * | 6/1992 | Lewis | 273/157 R |
| 5,395,118 A | * | 3/1995 | Barrett | 273/272 |
| 5,609,338 A | * | 3/1997 | Ibrahim | 273/153 S |
| 5,979,895 A | * | 11/1999 | Dove | 273/157 R |

* cited by examiner

Primary Examiner—Derris H. Banks
Assistant Examiner—Dmitry Suhol
(74) Attorney, Agent, or Firm—Dilworth & Barrese, LLP

(57) ABSTRACT

A kit containing a complete exercise to evaluate the cooperative skills of individuals in a group environment. The kit includes a package for storage, multiple pieces in predetermined geometric configuration such that a predetermined number of the multiple pieces may be fitted together to form multiple predetermined polygons, multiple containers configured and dimensioned to contain the multiple pieces and instructions. Also, a process for facilitating the kit's use, which includes instructing participants to gather around a work surface, placing containers in the center of the participants having multiple pieces, distributing documents containing participants' rules, a task and a mission for the participants, distributing documents having observer instructions defining the observer's role and instructing the participants to commence the exercise. During assembly, the observer and facilitator shall make observations and enforce the rules. Upon completion of the exercise, thereafter holding a discussion session to reflect upon the exercise.

17 Claims, 2 Drawing Sheets

Packaging the Activity

1. Place 3 shapes marked A in the box marked A.

2. Place 4 shapes marked B in the box marked B.

3. Place 2 shapes marked C in the box marked C.

4. Place 2 shapes marked D in the box marked D.

5. Place 4 shapes marked E in the box marked E.

KIT AND A PROCESS FOR FACILITATING EVALUATION OF COOPERATIVE SKILLS OF INDIVIDUALS IN A GROUP ENVIRONMENT

CROSS REFERENCE TO RELATED APPLICATIONS

This application is related to and claims priority to Provisional Application Ser. No. 60/174,293 filed Jan. 3, 2000 the entire contents of which are hereby incorporated by reference.

BACKGROUND

1. Technical Field

The present disclosure relates to exercises to evaluate the cooperative skills of individuals in a group environment. More particularly, the present disclosure relates to a kit containing a complete exercise to evaluate the cooperative skills of individuals in a group environment.

2. Description of Related Art

Various exercises are known to evaluate the cooperative efforts of individuals in a group environment. One such exercise is to utilize different sets of geometric shapes, which may be assembled into a number of squares. The exercise is known by various names among which are cooperation squares, cooperation blocks, corporation squares, conciliation squares and broken squares.

Since 1918 the average intelligence quotient (IQ) in the U.S. has risen 24 points. Meanwhile, between the 1970's and late 1980's, 6–16 year old individuals showed a steady decline in emotional intelligence (EQ). Similar observations during the same period have been made worldwide.

SUMMARY OF THE INVENTION

It is an object of the present invention to provide a kit for facilitating the evaluation of cooperative skills of individuals in a group environment.

It is another object of the present invention to provide a kit that is durable, nontoxic, shape retaining and recyclable.

It is further object of the present invention to provide a process for use of a kit for facilitating the evaluation of cooperative skills of individuals in a group environment.

The present disclosure provides for a kit, which addresses the need for a practical hands-on means of reversing the decline of emotional intelligence (EQ).

The kit contains a time and cost-effective response to today's education and training market needs. In one aspect of the present disclosure, the functional pieces of the kit may be made of durable, non-toxic cross-linked polyethylene foam, such that they retain shape and appearance after each use. Recyclable, the kit's components may even be affordably given as keepsakes to individual participants of an exercise as constant and tangible reminders of a memorable, often life altering experience. The pieces may be provided in any color to symbolize that the values of diversity and competition play alongside a traditional emphasis upon cooperation and communication. Guesswork has been eliminated from set-up and reassembly tasks. Packaging and instructions for use are handily included for more user-friendly facilitation.

The kit includes one or more packages for storing one or more sets of materials of the kit. Wherein a set of materials includes a plurality of squares and containers, and one or more sets of instructions. Each square is subdivided into a plurality of pieces, while each container is configured and dimensioned to contain the plurality of pieces from one or more subdivided squares.

In another aspect of the present disclosure provides a process for utilizing a kit for facilitating an evaluation exercise of cooperative skills of individuals in a group environment. This process includes the steps of instructing a plurality of participants to position themselves relative to a work surface and placing a plurality of containers in the center of the plurality of participants. Each container includes a plurality of pieces of squares. The process also includes distributing one or more sets of documents, each containing one or more sets of participants' rules, a task and a mission for the plurality of participants. In addition, the process includes distributing one or more sets of documents, containing observer instructions defining the observer's role, to one or more observers, and finally instructing the plurality of participants to commence the exercise.

Thereafter an open floor for discussion is held. The individual participants in this phase retrospectively ponder the program in an effort, at least in part, to increase one's cognizance thereby fostering cooperation and cooptation among others in their environment. Exchanges thereof are not limited merely to the group, as the facilitator and the observers may contribute to the discussion to further enhance the group's learning and discovery of themselves.

BRIEF DESCRIPTION OF THE DRAWINGS

Preferred embodiments of the presently disclosed kit are described herein with reference to the drawings, wherein.

DETAILED DESCRIPTION OF PREFERRED EMBODIMENTS

Figure 1:
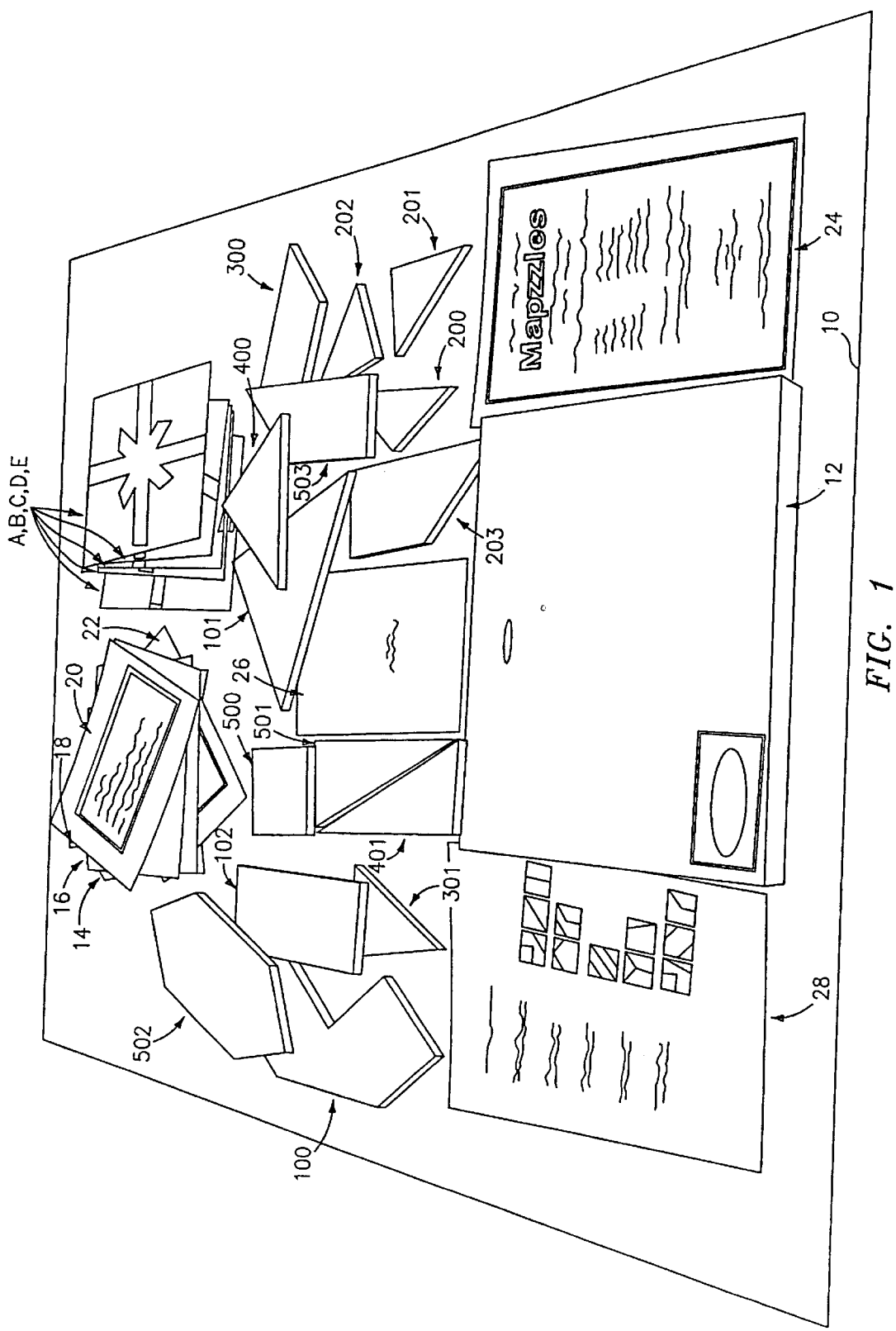
FIG. 1 is a perspective view of one embodiment of a kit for evaluating individual participant's cooperative skills in a group environment.

As shown in FIG. 1, a kit 10 includes at least one set of materials in a durable, nontoxic, shape retaining and reuseable package 12.

Each set of materials includes five containers, such as, for example, boxes A through E, containing puzzle pieces 100–102, 200–203, 300–301, 400–401 and 500–503, for each group of five participants.

Kit 10 also includes at least one set of instructions having five copies of the individual participants rules, task and mission 14, 16, 18, 20 and 22, one facilitator handbook 24, and one copy of the observer instructions 26 containing the observer's responsibilities, rules and questions.

Figure 2:
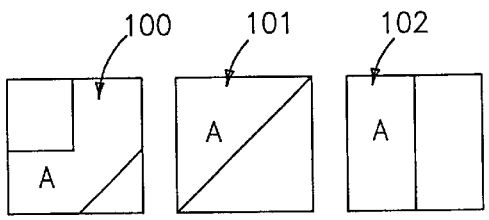
FIG. 2 is a chart illustrating the assembly of the kit's components for practicing the exercise.
Figure 2:
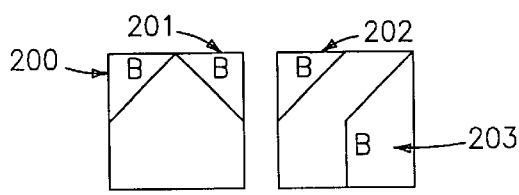
Figure 2:
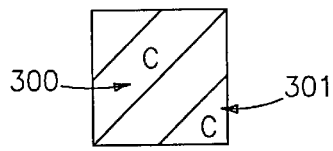
Figure 2:
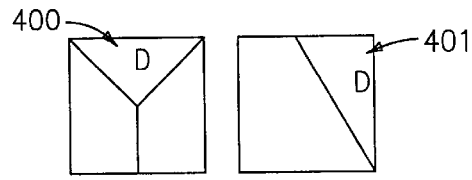
Figure 2:
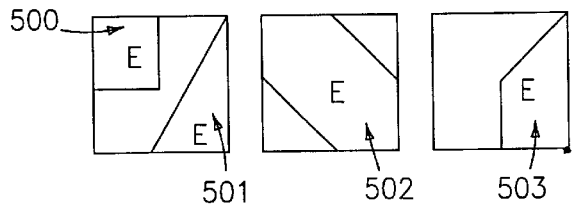

The kit 10 may be packaged in such a way to require organizing the materials as illustrated in the packaging instructions 28 of FIG. 2., i.e., pieces 100 through 102 in box A, pieces 200 through 203 in box B, pieces 300 and 301 in box C, pieces 400 and 401 in box D and pieces 500 through 503 in box E.

The process for utilizing the kit 10 will now be described in detail. The process involves essentially a two-phase program. In the first phase called the "Structured Experience," the group of individual participants utilize a kit 10, which is preferably prepackaged with all of the materials required, in a selected place or location where the ultimate task of each individual participant is to properly assemble one complete predetermined polygon from various pre-cut pieces, for example, a square. The group's mission will have been achieved once each individual participant in the group properly assembles one complete predetermined polygon of the same size as every other individual participant in the group.

Upon the completion of the first phase, the individual participants enter the second phase of the exercise called the "Facilitated Group Process and Discussion." The individual participants in this phase retrospectively ponder the program in an effort, at least in part, to increase one's cognizance thereby fostering cooperation and cooptation among others in their environment.

The place or location where undertaking the evaluation exercise should accommodate a group of individual participants comfortably at a work surface. It is preferred that the group of individual participants be sitting, either on the floor or at tables, without any material on the work surface.

In one preferred embodiment, the process utilizes one facilitator, five observers and five groups of five participants, where the critical requirement is that there be five individual participants per group. One observer is recommended for each group of individual participants, as it is ideal to have a five-to-one ratio between the individual participants and the observers. Thus, a facilitator may serve as roving observer should there be an insufficient number of persons available to assist as observers.

Observer Instructions 26 defining the role of the observer, contain information of the observer's responsibilities, rules of the evaluation exercise and questions for the observer to consider during observation of the evaluation exercise. It is preferred that one copy of instructions 26 be issued to each observer to review prior to commencement of the first phase. It is critical that the observers know and understand their role before commencement of the first phase of the exercise.

The Observer's responsibilities include the following: first to observe, recall and report, and second to enforce the rules. The rules prohibit communication of any form amongst the participants during phase I, transfer of any piece(s) 100–102, 200–203, 300–301, 400–401 and 500–503 is to limited to any given participant moving his/her own piece(s) 100–102, 200–203, 300301, 400–401 and 500–503 to another participant(s) work area. Hence, prohibiting any staging area of pieces 100–102, 200–203, 300–301, 400–401 and 500–503 and participants taking pieces 100102, 200–203, 300–301, 400–401 and 500–503 from another participant(s) Also included in the Observer's Instructions 26 is a list of questions for the Observer to ponder during phase I. These questions may include, for example:

1. Who was willing to give away pieces 100–102, 200–203, 300–301, 400–401 and 500–503 of their square?
2. Does anyone 'finish' a square and then totally withdraw from the groups' effort to accomplish a mission?
3. Is there anyone who continues to struggle with pieces 100–102, 200–203, 300–301, 400–401 and 500–503 yet seems unwilling to give any, or all of them away?
4. How many people on the team/group are actively engaged in putting pieces 100–102, 200–203, 300–301, 400–401 and 500–503 of the square together?
5. How would you describe the degree of frustration or the level of individual anxiety in your group?
6. Was there a turning point after which the quality of cooperation taking place suddenly changed?and
7. Were rules broken by anyone talking or pointing in an attempt to help other members solve some problem- ?Once the group of individual participants has been seated, the facilitator begins by placing "boxes" A, B, C, D and E in the center of each group. Leaving the boxes A, B, C, D and E intact and untouched by the participants until indicating that the first phase, the Structured Experience, is about to commence.

A copy of the participants' instructions 14, 16, 18, 20 and 22, for example, includes the "Task", "Rules" and "Mission" which is to be distributed to the individual participants, preferably one copy 14, 16, 18, 20 and 22, to each individual participant. The Task of each individual participant is to assemble one complete square. The Mission is for everyone in the group to assemble one complete square of equivalent size. Whereas the Rules of the group prohibit both verbal and nonverbal communications during this first phase, and that each individual is limited to moving their own pieces 100–102, 200–203, 300–301, 400–401 and 500–503. It should be noted that a participant is permitted to transfer his/her own piece 100–102, 200–203, 300–301, 400–401 and 500–503 to another participant, but is prohibited from placing any of his/her own pieces 100–102, 200–203, 300–301, 400–401 and 500–503 in a staging area for other participants to take from.

Thereafter, the facilitator may commence the first phase by saying something like: "Life gives people everything they need to succeed. There are no extras among life's gifts. We delude ourselves if we think we've been shortchanged or missing something." The facilitator may also read the exercise task, rules and mission/objective 14, 16, 18, 20 and 22 aloud to the group of participants. It is essential that the individual participants know and understand the task, rules and mission 14, 16, 18, 20 and 22 of the Structured Experience before commencement thereof.

Each group of participants receives several pieces 100–102, 200–203, 300–301, 400–401 and 500–503 needed to complete one predetermined polygon, for example a 6 inch by 6 inch square, which are located within the boxes A, B, C, D and E previously placed onto the work surface. Although each box A, B, C, D and E holds at least one piece 100–102, 200–203, 300–301, 400–401 and 500–503 of a square, no box A, B, C, D and E should hold all the pieces 100–102, 200–203, 300–301, 400–401 and 500–503 to one square, although one might. In a preferred embodiment, each box holds a plurality of pieces 100–102, 200–203, 300–301, 400–401 and 500–503 of a square.

Upon commencement of the first phase, the participants will access these pieces 100–102, 200–203, 300–301, 400–401 and 500–503 in their respective containers. Once accessed, the participants may proceed to fulfill their task and mission 14, 16, 18, 20 and 22 while they adhere to their rules 14, 16, 18, 20 and 22.

Although there are approximately fourteen possible combinations of pieces 100–102, 200–203, 300–301, 400–401 and 500–503 resulting in complete squares, there is only one combination that correctly forms the five desired (6 inch by 6 inch) squares in each group of participants.

During the second phase of the program, the group exchanges thoughts and observations they experienced during the first phase. Exchanges thereof are not limited merely to the group, as the facilitator and the observers may contribute to the discussion to further enhance the group's learning and discovery of themselves.

At the conclusion of the program, the facilitator may wish to invite the individual participants and even the observers to assist in the re-packaging of kit 10.

A time recommendation for the complete program that has been proven to be effective is as follows:

Phase I: 40 minutes for the Structured Experience;

Break: 10 minutes; and

Phase II: 30–40 minutes for the Facilitated Group Process and Discussion.

Although the illustrative embodiments of the present disclosure have been described herein with reference to the accompanying drawings, it is to be understood that the disclosure is not limited to those precise embodiments, and that various other changes and modifications may be affected therein by one skilled in the art without departing from the scope or spirit of the disclosure. All such changes and modifications are intended to be included within the scope of the present disclosure.

What is claimed is:

1. A kit for facilitating an evaluation exercise of cooperative skills of individuals in a group environment, which comprises:
    at least one package for storing at least one set of materials of said kit, wherein said at least one set of materials includes
        a plurality of pieces, each piece formed in one of various predetermined geometric configurations such that a predetermined number of the plurality of pieces fit together to form more than one of predetermined polygons;
        a plurality of containers, each container configured and dimensioned to contain the plurality of pieces;
        at least one set of instructions including at least one facilitator handbook having instructions and rules for said individuals utilizing the kit, at least one set of participants rules, a task and a mission for said plurality of participants; and
        at least one set of documents containing observer instructions.

2. A kit as recited in claim 1, wherein said predetermined polygon is a square.

3. A kit as recited in claim 2, wherein said more than one of said predetermined squares include 5 squares.

4. A kit as recited in claim 2, wherein said square measures 6 inches by 6 inches.

5. A kit as recited in claim 1, wherein said plurality of said polygons have substantially equivalent dimensions.

6. A kit as recited in claim 1, wherein said pieces include at least 3 pieces.

7. A kit as recited in claim 1, wherein said polygons are made from at least one selected from durable, nontoxic, shape retaining, and recyclable materials.

8. A kit as recited in claim 1, wherein said plurality of polygons are made from a material formed at least partially of polyethylene foam.

9. A kit as recited in claim 1, wherein said plurality of polygons are made from a material entirely of polyethylene foam.

10. A kit as recited in claim 1, wherein each container includes an equal quantity of said plurality of pieces.

11. A kit as recited in claim 1, wherein said observer instructions include observer responsibilities, rules of said evaluation exercise and questions for said observer to consider during observation of said evaluation exercise.

12. A kit as recited in claim 1, wherein said at least one set of documents containing observer instructions includes five copies.

13. A process for utilizing a kit for facilitating an evaluation exercise of cooperative skills of individuals in a group environment, comprising the steps of:
    instructing a plurality of participants to position themselves relative to a work surface;
    placing a plurality of containers in the center of said plurality of participants, each container including at least a plurality of pieces each forming a portion of a predetermined polygon;
    distributing at least one set of documents, each containing at least a set of participants' rules, a task and a mission for said plurality of participants;
    distributing at least one set of documents, containing observer instructions defining said observer's role, to at least one observer; and
    instructing said plurality of participants to commence said exercise.

14. A process as recited in claim 13, further comprising the steps of reading said set of participants' rules, task and mission aloud to said plurality of participants.

15. A process as recited in claim 13, wherein said distributing step includes instructing said at least one observer to read said instructions defining said observer's role.

16. A process as recited in claim 13, wherein said instruction step includes:
    instructing said plurality of participants to remove said plurality of pieces from said containers and to place said plurality of pieces onto said work surface, and assemble said plurality of pieces to form a square, wherein said plurality of said participants may transfer pieces amongst themselves while following said plurality of participants' rules, wherein said assembling is complete once all of said plurality of participants have each assembled a complete square;
    instructing said observer to observe said plurality of participants while performing said exercise, to recall said observer responsibilities, and then enforce said observer rules; and
    wherein a facilitator, undertaking said observer role in the absence of sufficient number of observers, once said plurality of participants have completed said assemblies, discussing with said plurality of participants and said observer said exercise in view of said facilitator's handbook and said observer instructions.

17. A process as recited in claim 13, further including the step of inviting said plurality of participants to repackage said kit.

* * * * *

UNITED STATES PATENT AND TRADEMARK OFFICE
CERTIFICATE OF CORRECTION

PATENT NO. : 6,551,106 B1
DATED : July 18, 2003
INVENTOR(S) : John M. Sherin

It is certified that error appears in the above-identified patent and that said Letters Patent is hereby corrected as shown below:

Column 2,
Line 23, "cooptation" should be -- collaboration --

Column 3,
Line 10, "cooptation" should be -- collaboration --

Signed and Sealed this

Twenty-sixth Day of August, 2003

JAMES E. ROGAN
*Director of the United States Patent and Trademark Office*